United States Patent [19]

Murano et al.

[11] Patent Number: 4,841,622
[45] Date of Patent: Jun. 27, 1989

[54] APPARATUS FOR INTERFERENCE-FITTING AN INNER MEMBER WITH AN ANNULAR OUTER MEMBER

[75] Inventors: Tadao Murano, Zama; Hisao Hirata, Hiratsuka; Toshimitsu Hayakawa, Toyokawa; Takeshi Saito, Yokohama, all of Japan

[73] Assignee: Topy Kogyo Kabushiki Kaisha, Tokyo, Japan

[21] Appl. No.: 224,906

[22] Filed: Jul. 27, 1988

[30] Foreign Application Priority Data

Jul. 28, 1987 [JP] Japan .................. 62-186516

[51] Int. Cl.⁴ .......................... B23P 19/02
[52] U.S. Cl. ..................... 29/525; 29/159.01; 29/159.1; 29/159 R; 72/354
[58] Field of Search .......... 29/525, 159.01, 159.1, 29/159 R; 72/354

[56] References Cited

U.S. PATENT DOCUMENTS 3,688,373 9/1972 Gregg .................. 29/159 R
4,733,448 3/1988 David .................. 29/159.01

Primary Examiner—P. W. Echols
Assistant Examiner—K. Jordan
Attorney, Agent, or Firm—Cushman, Darby & Cushman

[57] ABSTRACT

An apparatus and method for interference-fitting an inner member having a flange and an annular outer member. The apparatus includes a supporting member for floatingly supporting the inner member at its flange in the axial direction of the inner member. The floating support of the supporting member is changeable to a locked support such that the support member can support the inner member at its flange in the axial direction when it is locked. Before the interference-fitting is performed, the supporting member adjusts its support point and is locked. Because the inner member is supported at its flange in the axial direction during the interference-fitting, the inner member is not inclined even if it receives a circumferentially non-uniform force. As a result, a high quality fitting is obtained.

12 Claims, 3 Drawing Sheets

APPARATUS FOR INTERFERENCE-FITTING AN INNER MEMBER WITH AN ANNULAR OUTER MEMBER

BACKGROUND OF THE INVENTION

1. Field of the Invention

The present invention relates to an apparatus and method for interference-fitting (tightly fitting) an inner member with an annular outer member. The inner member has a flat portion substantially perpendicular to an axis of the inner member and a substantially cylindrical flange extending in the axial direction from the outermost end of the flat portion. This apparatus and method can be used in the fitting of a disk into a rim of a disk wheel of a vehicle.

2. Description of the Prior Art

A prior art fitting of a disk into a rim of a disk wheel will be explained referring to FIG. 3. In the prior art fitting, an inner member 31 of the disk is carried on a carrying member 32 such that inner member 31 is supported by carrying member 32 only at the radially inner portion of inner member 31. An outer member 33 of the rim to be interference-fitted with inner member 31 is held between upper and lower outer member supports, 34 and 35, respectively, and is moved relative to inner member 31 by lowering a slide 36 of a press apparatus. It should be noted that inner member 31 is not supported at its flange 31a extending from the radially outermost end of the flat portion of inner member 31 in the axial direction.

Because the disk has a plurality of fashion holes arranged around the axis of the disk, inner member 31 does not have a uniform rigidity in the circumferential direction of inner member 31. Further, because the flange of the disk has a plurality of recesses which recede in the axial direction of the disk from the free end of the flange and are formed spaced from each other in the circumferential direction of the flange, and because the surface of the free end of the flange is not always included in a single plane perpendicular to the axis of the disk, inner member 31 cannot be supported in the axial direction at its flange 31a. Furthermore, because the rim is formed by a rolling formation of a plate and the disk is formed by a press formation of a plate, inner member 31 and outer member 33 are not always formed to exactly circular contours.

Outer member 33 is interference-fitted to inner member 31, which is not supported at its outermost end during the fitting process, by adding an axial force which may be non-uniform in the circumferential direction. Therefore, inner member 31 will be inclined, receive the non-uniform force, and unwanted inclination will occur in the fitting with outer member 33. Further, the inclined fitting will cause a complicated torsional deformation in inner member 31 due to the circumferentially non-uniform rigidity of inner member 31. When such an inclination and a torsional deformation of inner member 31 exceed the allowable limits, the disk wheel has to be ejected from the wheel manufacture line as a defective one.

For the purpose of preventing inclination and torsional deformation of inner member 31 during the interference-fitting, it would be the best way to support inner member 31 at its outermost portion. However, as discussed previously, the prior art cannot support inner member 31 at its outermost portion.

OBJECT AND SUMMARY OF THE INVENTION

An object of the present invention is to provide an interference-fitting apparatus and method wherein it is possible to support an inner member in the axial direction at its outermost end to thereby prevent inclination and torsional deformation from taking place when the inner member is interference-fitted with an annular outer member.

According to the present invention, the above-mentioned object can be achieved by an apparatus for interference-fitting an inner member with an annular outer member. The inner member has a flat portion substantially perpendicular to an axis of the inner member and a substantially cylindrical flange extending from the outermost end of the flat portion in the axial direction. A carrying member carries the inner member thereon at the flat portion of the inner member, the carrying member being provided with a guide for centering the inner member. A pushing member, arranged above the carrying member and moveably relative to the carrying member, pushes the inner member, the pushing member pushing the flat portion of the inner member against the carrying member to fixedly hold the inner member between the carrying member and the pushing member when the pushing member is lowered. A supporting member, arranged radially outside the carrying member, initially floatingly supports the inner member at the flange of the inner member. The floating support is changed to a locked support to fixedly support the flange of the inner member after the carrying member and the pushing member fixedly hold the inner member. A centering member, arranged coaxially with respect to the carrying member, centers the outer member coaxially to the inner member which has been centered by the carrying member. A moving member, provided against at least one of the inner and outer members, moves one of the inner and outer members relative to the other of the inner and outer members to interference-fit the inner and outer members.

According to the present invention, the inner and outer members are interference-fitted as in the following manner:

The inner member is carried on the carrying member and is centered by the guide of the carrying member. At this time, the inner member is floatingly supported by the supporting member at its flange. Then, the pushing member is lowered and pushes the inner member against the carrying member to fixedly hold the inner member between the pushing member and the carrying member. When the inner member is pushed downward by the pushing member, the upper end of the supporting member contacting the flange of the inner member is moved downward and automatically adjusts its supporting point in the vertical direction. When the inner member has been fixedly held between the pushing member and the carrying member, the supporting member is locked to fixedly support the inner member at its flange. Then, the centering member centers the outer member coaxially to the inner member which has been centered by the carrying member. Finally, the moving member moves one of the inner and outer members relative to the other of the inner and outer members and interference-fits the inner member with the outer member. In the above interference-fitting, before the inner and outer members are interference-fitted, the inner and outer members are aligned to each other and the axes of the inner and outer members are made exactly parallel.

Further, the inner member is supported at its outermost flange and the flat portion of the inner member is fixedly held between the carrying member and the pushing member. As a result, no inclination of the inner member takes place during the fitting and a high quality fitting is realized.

BRIEF DESCRIPTION OF THE DRAWINGS

These and other objects and advantages of the present invention will become more apparent and more readily appreciated from the following detailed description of the presently preferred embodiment of the invention taken in conjunction with the accompanying drawings, of which.

DETAILED DESCRIPTION OF THE PREFERRED EMBODIMENTS

Figure 1:
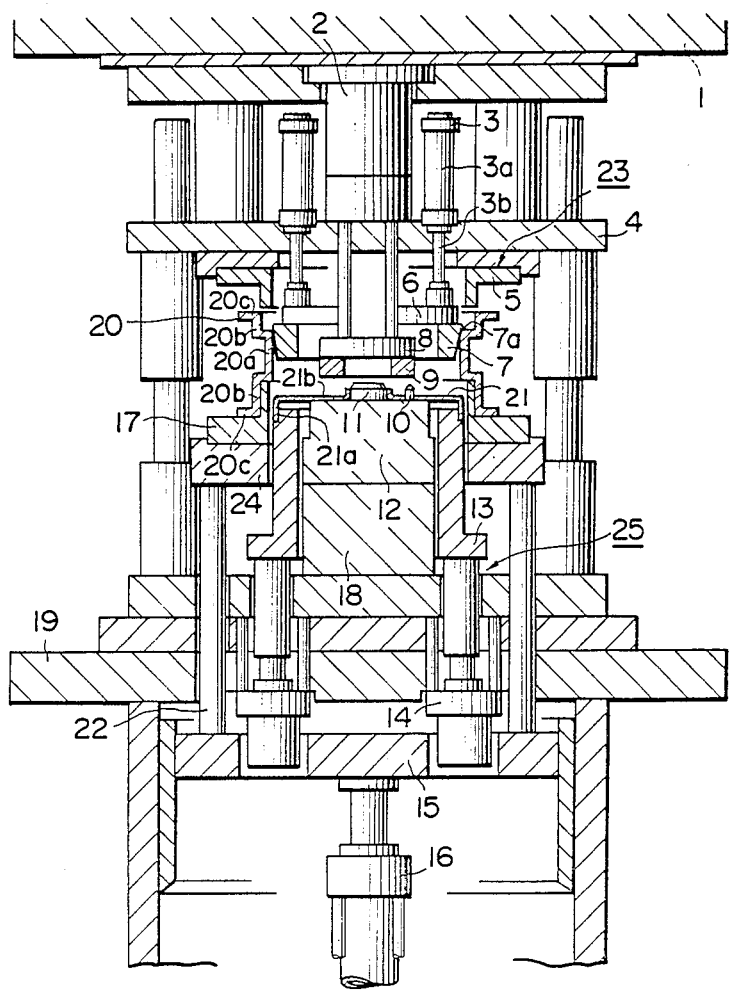
FIG. 1 is an elevational section of an apparatus for interference-fitting an inner member with an outer member according to one embodiment of the present invention.

An assembly of an inner member 21 and an outer member 20 interference-fitted to inner member 21 can be seen in many industrial products, for example, a vehicle wheel wherein inner member 21 is a disk and outer member 20 is a rim. Inner member 21, shown in both FIGS. 1 and 2, includes a flat portion 21b substantially perpendicular to an axis of inner member 21 and a substantially cylindrical flange (a disk flange) 21a which extends in the axial direction from the outermost end of flat portion 21b. The flat portion of inner member 21 has an hub hole 21c and a plurality of bolt holes 21d around hub hole 21c. Outer member 20 includes a substantially cylindrical drop portion 20a having radially outwardly extending portions at both axial ends thereof, rim bead seats 20b extending in the substantially axial direction from the radially outer ends of drop portion 20a, and rim flanges 20c extending substantially radially outward from the ends of rim bead seats 20b. Flange 21a of inner member 21 is interference-fitted with outer member 20 at drop portion 20a in the manufacturing process of the disk wheel and then is welded to outer member 20.

Inner member 21 further has a plurality of fashion holes 21f bored around hub hole 21c, and flange 21a has a plurality of recesses 21e at its free end. Thus, inner member 21 has a non-uniform rigidity in the circumferential direction of inner member 21. Further, since inner member 21 is formed by a press and since outer member 20 is formed by rolling of a plate and welding of both ends of the rolled plate, inner member 21 and outer member 20 usually have no exactly circular contours.

An interference-fitting apparatus according to the present invention generally includes a carrying member 12, a pushing member 9, a supporting member 25, a centering member 7, and a moving member 23. Carrying member 12 carries inner member 21 thereon at its flat portion 21b. Carrying member 12 includes a guide 11 for centering inner member 21 coaxially to carrying member 12. Pushing member 9 is arranged above carrying member 12 and movably relative to carrying member 12 in the axial direction of carrying member 12. Pushing member 9 pushes flat portion 21b of inner member 21 against carrying member 12 to fixedly hold inner member 21 between pushing member 9 and carrying member 12 when pushing member 9 is lowered. Supporting member 25 is arranged radially outside carrying member 12 and is capable of floatingly supporting inner member 21 at its flange 21a. Floating support by supporting member 25 of flange 21a is obtained initially. Although this floating support is not absolutely necessary, it is the easiest way to obtain correct alignment. When supporting member 25 is locked at a support point, supporting member 25 fixedly supports inner member 21 at its flange 21a in the axial direction. Centering member 7 is arranged coaxially with respect to carrying member 12. Centering member 7 centers outer member 20 coaxially to inner member 21 which has been centered by guide 11 of carrying member 12. Moving member 23 is provided against at least one of inner and outer members 21 and 20 so as to move one of inner and outer members 21 and 20 relative to the other of inner and outer members 21 and 20 in the axial direction of carrying member 12.

More particularly, carrying member 12 is fixedly supported from a fixed bed 19 of a press apparatus which may be either a specific pressing apparatus or a conventional press apparatus. Carrying member 12 has a vertically extending axis, a flat upper surface exactly perpendicular to the axis of carrying member 12, and a substantially cylindrical outside surface with a diameter smaller than a diameter of an inner surface of flange 21a of inner member 21.

Guide 11 of carrying member 12, in the form of a protrusion, protrudes upward from the upper surface of carrying member 12. Guide 11 is provided so as to be coaxial to the axis of carrying member 12 and has a cylindrical outside surface with a diameter that can slidably fit the inside surface of hub hole 21c formed in inner member 21. Guide 11 centers inner member 21 coaxially to the axis of carrying member 12 when guide 11 is brought into a sliding engagement with inner member 21 at hub hole 21c.

Carrying member 12 further contains an auxiliary guide 10 which protrudes upward from the upper surface of carrying member 12 and is positioned radially offset from the axis of carrying member 12 so as to slidingly fit one of bolt holes 21d formed in inner member 12. Auxiliary guide 10 defines a circumferential position of inner member 21 with respect to carrying member 12.

Figure 2:
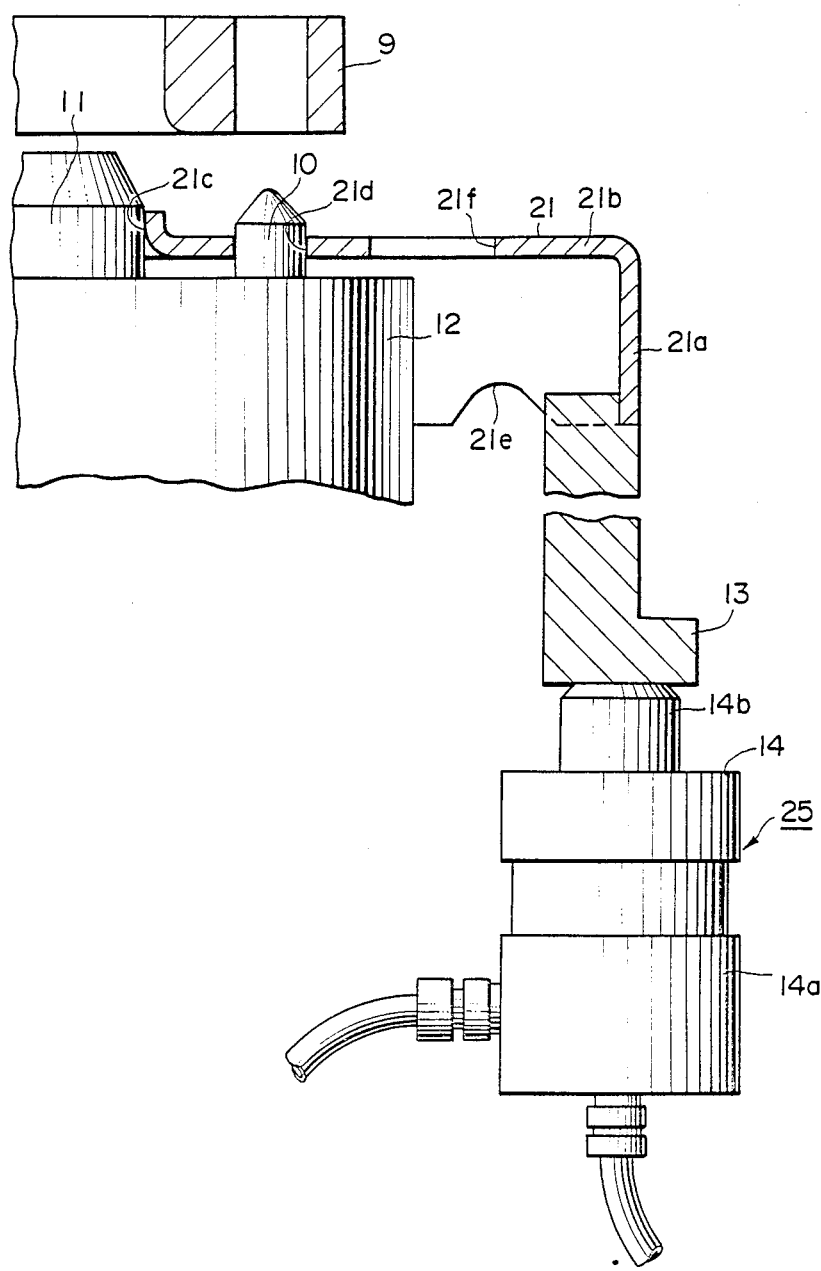
FIG. 2 is an enlarged partial section of the apparatus of FIG. 1.
Figure 3:
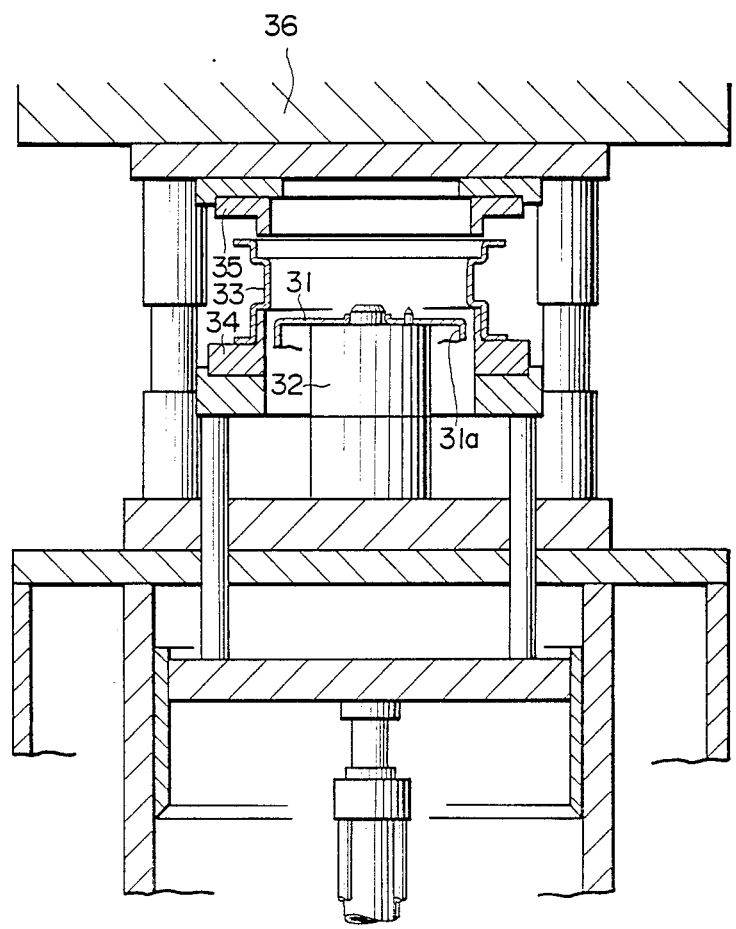
FIG. 3 is an elevational section of an apparatus of the prior art.

Supporting member 25 comprises a plurality of cylinder devices 14 arranged around the axis of carrying member 12 and beneath flange 21a of inner member 21 when inner member 21 is carried on carrying member 12. As shown in FIG. 2, each of cylinder devices 14 has a cylinder portion 14a fixedly supported from fixed bed 19 of the press apparatus and a rod 14b selectively moveable and able to be locked relative to cylinder portion 14a in the axial direction of carrying member 12. Cylinder devices 14 floatingly support inner member 21 at its flange 21a when rod 14b is moveable relative to cylinder portion 14a and cylinder devices 14 fixedly support inner member 21 at its flange 21a when the movement of rod 14b relative to cylinder portion 14a is locked so as not to move relative to cylinder portion 14a. Cylinder devices 14 use air-cylinders. The floating support and fixed support of supporting member 25 are selectively changed by means of a solenoid valve (not shown because such a valve is well known to the skilled in the art) provided on the air supply circuit for cylinder devices 14. Supporting member 25 also has a plurality of flange supports 13 for supporting flange 21a of inner member 21. Each of flange supports 13 is coupled to rod 14b of cylinder device 14.

As shown in FIG. 2, pushing member 9 has a flat bottom surface. A cylinder device 2 is provided between pushing member 9 and slide 1 of the press apparatus. A cylinder portion of cylinder device 2 is coupled to a slide 1 which is driven relative to bed 19 in the axial direction of the press apparatus. A rod of cylinder device 2 is coupled to pushing member 9 via a pushing plate 8. Cylinder device 2 drives pushing member 9 in the axial direction of carrying member 12.

Centering member 7 has an annular member with a tapered outer surface 7a which is coaxial to carrying member 12. The diameter at one end of the tapered outer surface 7a is larger than the diameter of the inside surface of outer member 20 and the diameter at the other end of the tapered outer surface 7a is smaller than the diameter of the inside surface of outer member 20. At least one cylinder device 3 is provided for driving centering member 7 in the axial direction of carrying member 12. Cylinder device 3 has a cylinder portion 3a coupled to an upper die 4 which is fixedly coupled to slide 1 of the press apparatus and a rod portion 3b which is coupled to centering member 7 via a plate 6. Centering member 7 is brought into a sliding engagement with outer member 20 to thereby center outer member 20 coaxially to inner member 21 which has been centered by carrying member 12 when centering member 7 is lowered by cylinder device 3.

Moving member 23 includes a lower outer member support 17 and an upper outer member support 5. Lower outer member support 17 supports outer member 20 thereon and is supported by a moveable support plate 24 which is coupled to a moveable cushion plate 15 via a connecting rod 22. Cushion plate 15 is supported via a cushion cylinder 16 by fixed bed 19 of the press apparatus such that lower outer member support 17 is moveable relative to carrying member 12 and fixed bed 19 of the press apparatus because of the provision of cushion cylinder 16. Upper outer member support 5 is arranged above lower outer member support 17 and is coupled to upper die 4 which is supported by slider 1 of the press apparatus so as to be moveable relative to lower die 18. Upper outer member support 5 is moveable relative to both lower outer member support 17 and carrying member 12 in the axial direction of carrying member 12. Upper outer member support 5 approaches outer member 20, then holds outer member 20 between lower and upper outer member supports 17 and 5 and moves outer member 20 relative to inner member 21 when slide 1 of the press apparatus is driven downward. In the embodiment, outer member 20 is moved relative to inner member 21 by moving member 23, but inner member 21 may be moved by moving member 23. Such alteration in design is easy to the skilled in the art.

Using the above-mentioned apparatus, inner and outer members 21 and 20 are interference-fitted with each other as in the following manner:

At first, inner member 21 is carried on carrying member 12 and is centered by guide 11 of carrying member 12 so as to be coaxial to carrying member 12. At this time, inner member 21 is floatingly supported by support member 25 at its flange 21a. Thus, the lower surface of flat portion 21b of inner member 21 will be distanced from the upper surface of carrying member 12. Then, pushing member 9 is lowered by driving cylinder device 2. When pushing member 9 is brought into contact with inner member 21, pushing member 9 moves inner member 21 downward and pushes inner member 21 against carrying member 12 to fixedly hold flat portion 21b of inner member 21 between pushing member 9 and carrying member 12. While inner member 21 is moved downward by pushing member 9, the upper end of supporting member 25 contacting flange 21a of inner member 21 is moved downward and automatically adjusts its supporting points in the vertical direction. When inner member 21 has been fixedly held between pushing member 9 and carrying member 12, supporting member 25 is locked to fixedly support inner member 21 at its flange 21a. At this moment, flat portion 21b of inner member 21 is exactly perpendicular to the axis of carrying member 12. Then, centering member 7 is lowered by driving cylinder device 3 and centers outer member 20 coaxially to the inner member 21 which has been centered by carrying member 12. Finally, slide 1 of the press apparatus is driven downward, and upper outer member support 5 is lowered toward lower outer member support 17 to squeeze outer member 20 between upper and lower outer member supports 5 and 17. When slide 1 is further lowered, outer member 20 and upper and lower outer member supports 5 and 17 are moved downward relative to inner member 21 by the stroke amount of the rod of cushion cylinder 16 to thereby interference-fit inner and outer members 21 and 20.

In the above interference-fitting, after inner and outer members 21 and 20 have been aligned to each other, flat portion 21b of inner member 21 has been held perpendicularly to the axis of carrying member 12, and inner member 21 has been supported at its flange 21a in the vertical direction, the interference-fitting between inner and outer members 21 and 20 is performed. As a result, no inclination of inner member 21 takes place during the fitting and a high quality of fitting is realized.

Although only the preferred embodiment of the present invention has been described in detail above, those skilled in the art will readily appreciate that many modifications and alterations are possible without departing from the novel teachings and advantages of the invention. Accordingly, all such modifications and alterations are intended to be included within the spirit and scope of the present invention as defined in the following claims.

What is claimed is:

1. An apparatus for interference-fitting an inner member with an annular outer member, said inner member having a flat portion substantially perpendicular to an axis of the inner member and a substantially cylindrical flange extending from an outermost end of said flat portion, said apparatus comprising:

means for carrying said inner member thereon at said flat portion of said inner member, said carrying means having a guide for centering said inner member;

means, arranged above said carrying means and moveable relative to said carrying means, for pushing said flat portion of said inner member against said carrying means to fixedly hold said inner member between said carrying means and said pushing means;

means, arranged radially outside said carrying means, for floatingly supporting said flange of said inner member before said inner member is fixedly held between said pushing means and said carrying means and securely supporting said flange of said inner member after said flat portion of said inner member has been fixedly held between said pushing means and said carrying means;

means, arranged coaxially with respect to said carrying means, for centering said outer member coaxially to said inner member which has been centered by said carrying means; and means, provided against at least one of said inner and outer members, for moving one of said inner and outer members relative to the other of said inner and outer members to interference-fit said inner and outer members with each other.

2. The apparatus according to claim 1, wherein said carrying means comprises a carrying member fixedly supported with respect to a fixed bed of a press apparatus, said carrying member having a vertically extending axis, a flat upper surface perpendicular to said axis of said carrying member, and a substantially cylindrical outside surface with a diameter smaller than a diameter of an inner surface of said flange of said inner member.

3. The apparatus according to claim 2, wherein said guide of said carrying means protrudes upward from said upper surface of said carrying member, said guide being coaxial to said carrying member and having a cylindrical outside surface with a diameter which can slidingly fit with an inside surface of a hub hole bored in said inner member, said guide centering said inner member coaxially to said axis of said carrying member when said guide is brought into a sliding engagement with said inner member at the hub hole.

4. The apparatus according to claim 2, wherein said carrying means further comprises an auxiliary guide which protrudes upward from said upper surface of said carrying member at a position radially offset from said axis of said carrying member and can slidingly fit with one of a plurality of bolt holes formed in said inner member around a hub hole bored in said inner member, said auxiliary guide positioning said inner member with respect to said carrying means in a circumferential direction of said carrying means.

5. The apparatus according to claim 1, wherein said supporting means comprises a plurality of cylinder devices arranged around said carrying means and beneath said flange of said inner member when said inner member is carried on said carrying means, each of said cylinder devices having a cylinder portion fixedly supported from a bed of a press apparatus and a rod selectively changeable between moveable and locked conditions relative to said cylinder portion in an axial direction of said carrying means, said cylinder devices floatingly supporting said inner member at its flange when said rod is moveable with respect to said cylinder portion and said cylinder devices fixedly supporting said inner member at its flange when said rod is locked with respect to said cylinder portion so as not to move relative to said cylinder portion.

6. The apparatus according to claim 5, wherein said cylinder devices comprise air-cylinders.

7. The apparatus according to claim 5, wherein said supporting means further comprises a plurality of flange supports for supporting said flange of said inner member, each of said flange supports being coupled to said rod of said cylinder devices.

8. The apparatus according to claim 1, wherein said pushing means comprises a ring-like pushing member and a cylinder device for driving said pushing member in an axial direction of said carrying means.

9. The apparatus according to claim 8, wherein said cylinder device of said pushing means includes a cylinder portion and a rod moveable relative to said cylinder portion, said cylinder portion being fixedly coupled to a slide of a press which is moveable relative to a fixed bed of the press apparatus and said rod being coupled to said pushing member.

10. The apparatus according to claim 1, wherein said centering means comprises:

an annular centering member having a tapered outer surface which is coaxial to said carrying means and is tapered so that said tapered outer surface has a diameter at one end larger than a diameter of an inside surface of said outer member and a diameter at another end smaller than the diameter of the inside surface of said outer member; and a cylinder device for driving said centering member in an axial direction of said carrying member, said centering member being brought into a sliding engagement with said outer member to thereby center said outer member coaxially to said inner member which has been centered by said carrying means when said centering member is lowered by said cylinder device.

11. The apparatus according to claim 1, wherein said moving means comprises:

a lower outer member support, supported via a cushion cylinder from a fixed bed of a press apparatus, for supporting said outer member thereon, said lower outer member support being moveable relative to both said carrying means and said fixed bed of said press apparatus due to said cushion cylinder; and an upper outer member support arranged above said lower outer member support and coupled to a slider of the press apparatus via an upper die of the press apparatus, said upper outer member support being moveable relative to both said lower outer member support and said carrying member in an axial direction of said carrying member, said upper outer member support approaching said outer member, then holding said outer member between said lower and upper outer member supports and then moving said outer member relative to said inner member when the slide of said press apparatus is driven downward.

12. The apparatus according to claim 11, wherein said lower outer member support is supported via an axially moveable support plate for supporting said lower outer member support thereon by a cushion plate coupled to said support plate via a connecting rod, and said cushion plate is supported via said cushion cylinder by said fixed bed of said press apparatus so as to be moveable relative to said fixed bed of said press apparatus, and wherein said upper outer member support is supported by an upper die coupled to said slide of said press apparatus.

* * * * *